(12) United States Patent
Liu et al.

(10) Patent No.: US 11,934,287 B2
(45) Date of Patent: Mar. 19, 2024

(54) METHOD, ELECTRONIC DEVICE AND COMPUTER PROGRAM PRODUCT FOR PROCESSING DATA

(71) Applicant: EMC IP Holding Company LLC, Hopkinton, MA (US)

(72) Inventors: Weiyang Liu, Shanghai (CN); Yongbing Xue, Shanghai (CN); Jinjin Wang, Shanghai (CN); Mengze Liao, Shanghai (CN); Qi Wang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 296 days.

(21) Appl. No.: 17/186,604

(22) Filed: Feb. 26, 2021

(65) Prior Publication Data
US 2022/0138074 A1    May 5, 2022

(30) Foreign Application Priority Data
Oct. 30, 2020    (CN) .......................... 202011192341.5

(51) Int. Cl.
*G06F 9/44*    (2018.01)
*G06F 9/445*    (2018.01)
*G06F 11/30*    (2006.01)

(52) U.S. Cl.
CPC ...... *G06F 11/3068* (2013.01); *G06F 9/44505* (2013.01); *G06F 9/44526* (2013.01); *G06F 11/302* (2013.01)

(58) Field of Classification Search
CPC .................................... G06F 1/32; G06F 9/44
See application file for complete search history.

(56) References Cited

U.S. PATENT DOCUMENTS

| | | | |
|---|---|---|---|
| 2009/0164667 A1* | 6/2009 | Zhang | G06F 15/16 709/248 |
| 2014/0046896 A1* | 2/2014 | Potter | G06Q 10/1053 707/603 |
| 2014/0189808 A1* | 7/2014 | Mahaffey | G06F 21/31 726/4 |
| 2017/0111328 A1* | 4/2017 | Leon | H04L 9/14 |
| 2018/0285572 A1* | 10/2018 | Hanner | G06F 21/577 |
| 2020/0364274 A1* | 11/2020 | Ferguson | G06F 16/2379 |

* cited by examiner

*Primary Examiner* — Keshab R Pandey
(74) *Attorney, Agent, or Firm* — Chamberlain, Hrdlicka, White, Williams & Aughtry; Aly Z. Dossa

(57) ABSTRACT

A method, electronic device, and computer program product for processing data is disclosed. The method includes acquiring a configuration file for generating and sending a structured report, the structured report involving analysis of an application. The method also includes acquiring, based on an address of a data source in the configuration file, data from the data source to add the data to the structured report, the data source including the same type of data generated by the application. The method includes sending, based on an identifier of a target server in the configuration file, the structured report to the target server for analyzing the application. With this method, the format of a structured report to be acquired can be adjusted at any time without version upgrade, thereby saving time.

20 Claims, 7 Drawing Sheets

METHOD, ELECTRONIC DEVICE AND COMPUTER PROGRAM PRODUCT FOR PROCESSING DATA

CROSS REFERENCE TO RELATED APPLICATION

This application claims priority under 35 U.S.C. § 119 to Chinese Patent Application No. 202011192341.5, filed on Oct. 30, 2020. The contents of Chinese Patent Application No. 202011192341.5 are incorporated by reference in its entirety.

TECHNICAL FIELD

Embodiments of the present disclosure relate to the field of data management, and more particularly, to a method, a device, and a computer program product for processing data.

BACKGROUND

With the rapid development of computer technology, computers are used to process increasingly more data. In order to better manage these data, users run various data management systems on their computing devices. These data management systems may be configured to process various data generated on computing devices, such as backing up data, recovering data, or performing various other appropriate operations on data.

As the data management systems are improved, the data management systems record various data in the process of processing data, such as log data generated during the running process of the systems or data of various operations performed. The data management systems may be analyzed through the recorded data. However, there are still many problems to be solved in the process of analyzing the data management systems through these data.

SUMMARY

The embodiments of the present disclosure provide a method, an electronic device, and a computer program product for processing data.

According to one aspect of the present disclosure, a method for processing data is provided. The method includes: acquiring a configuration file for generating and sending a structured report, the structured report involving analysis of an application. The method also includes: acquiring, based on an address of a data source in the configuration file, data from the data source to add the data to the structured report, the data source including the same type of data generated by the application. The method also includes: sending, based on an identifier of a target server in the configuration file, the structured report to the target server for analyzing the application.

According to another aspect of the present disclosure, an electronic device is provided. The electronic device includes: a processor; and a memory, which stores computer program instructions. The processor runs the computer program instructions in the memory to control the electronic device to perform actions including: acquiring a configuration file for generating and sending a structured report, the structured report involving analysis of an application; acquiring, based on an address of a data source in the configuration file, data from the data source to add the data to the structured report, the data source including the same type of data generated by the application; and sending, based on an identifier of a target server in the configuration file, the structured report to the target server for analyzing the application.

According to another aspect of the present disclosure, a computer program product is provided. The computer program product is tangibly stored on a nonvolatile computer-readable medium and includes machine-executable instructions. The machine-executable instructions, when executed, cause a machine to perform the steps of the methods in the first aspect of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

The same or corresponding reference numerals in the various drawings represent the same or corresponding portions.

DETAILED DESCRIPTION

Figure 1:
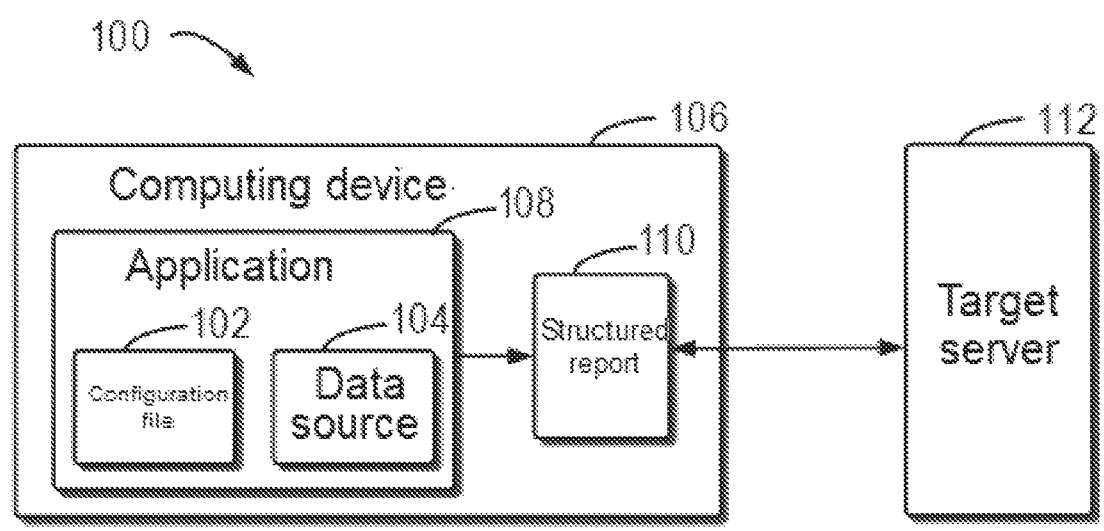
FIG. 1 illustrates a schematic diagram of example environment 100 where a device and/or a method according to one or more embodiments of the present disclosure may be implemented.

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of the embodiments of the present disclosure, the term "include" and similar terms thereof should be understood as open-ended inclusion, i.e., "including but not limited to." The term "based on" should be understood as "based at least in part on." The term "one embodiment" or "the embodiment" should be understood as "at least one embodiment." The terms "first," "second," etc. may refer to different or identical objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the present disclosure, and are not intended to impose any limitation on the scope of the present disclosure.

Generally, in order to better understand the running of a data management system, a data management system provider usually collects data on the running of the data management system from a computing device of a user. By collecting these data, the provider may understand the status and usage of the data management system running on a computer of the user. With the development of the data management system, increasingly more data needs to be collected from each computer.

The data collected from the computer of the user is generally sent to a target server in the form of structured reports, such as structured telemetry reports. These structured reports define data types and data formats, which are different from unstructured reports.

In traditional solutions, the process of acquiring structured reports is hard-coded in the data management system. When the data management system is running, the generated structured reports are sent back to the target server.

However, if more data needs to be sent back to the target server through the structured reports after running the data management system on a client, the code has to be modified. At this moment, the user needs to upgrade to the latest version. Only after the upgrade, can the computer of the user send reports in a new format. This process takes a lot of time. Moreover, a lot of development work is needed in the process of determining the adjustment of the data sending. In addition, customers cannot send customized information through structured reports.

In order to solve the above and other potential problems, embodiments of the present disclosure provide methods for processing data. In such methods, a separate configuration file for generating and sending a structured report is set. A computing device acquires the configuration file, and then acquires, based on an address of a data source in the configuration file, data from the data source to add the data to the structured report. The computing device sends, based on an identifier of a target server in the configuration file, the structured report to the target server for analyzing an application. With such methods, the format of telemetry data can be adjusted at any time as required without the version upgrade of a software system. In addition, embodiments can easily add/delete the content to be sent in the structured report, thereby saving a lot of development time. Moreover, each application can send a structured report in a predetermined format or a plurality of structured reports, thereby improving the user experience and reducing the workload of developers.

The embodiments according to the present disclosure will be described in detail below through FIGS. 1 to 8. FIG. 1 illustrates a schematic diagram of example environment 100 where a device and/or a method according to one or more embodiments of the present disclosure may be implemented.

As shown in FIG. 1, example environment 100 includes computing device 106 and target server 112. Computing device 106 may send generated structured data report 110 to target server 112 for analyzing application 108.

Computing device 106 is configured to run application 108 and may generate structured report 110 of application 108. Computing device 106 may be implemented as any type of computing device, including, but not limited to, a mobile phone (for example, smart phone), a laptop computer, a portable digital assistant (PDA), an electronic book (e-book) reader, a portable game machine, a portable media player, a game machine, a set-top box (STB), a smart television (TV), a personal computer, a laptop computer, an on-board computer (for example, navigation unit), etc. Application 108 may be various applications that process data, such as a power protection data manager.

Configuration file 102 may be used to generate structured report 110 and send structured report 110. Configuration file 102 includes an address of data source 104 to be accessed to generate structured report 110 and an identifier of server 112 to which the structured report is to be sent, such as a network address of target server 112. Alternatively or additionally, configuration file 102 includes a plugin configuration. The plugin configuration includes an identifier of a plugin that accesses data source 104 and/or an identifier of a plugin that sends data to target server 112, and parameters used by the plugins. Alternatively or in addition, the plugin configuration further includes an identifier of a plugin that may process the data in structured report 110 and corresponding parameters.

In some embodiments, the content in configuration file 102 may be adjusted. For example, a plugin to be called in configuration file 102 may be adjusted, such as adding a plugin identifier and corresponding parameters or removing a plugin identifier and corresponding parameters. Alternatively or additionally, a plugin identifier corresponds to the type of a plugin. In some embodiments, configuration file 102 may be replaced. For example, configuration file 102 may be replaced with a new configuration file by a user, a provider of application 108, or by another computing device. The above examples are only for describing the present disclosure, rather than specifically limiting the present disclosure.

Configuration file 102 and structured report 110 are shown in FIG. 1, which are only examples, rather than a specific limitation to the present disclosure. In example environment 100, a plurality of configuration files may be included, and a plurality of corresponding structured reports are generated based on the plurality of configuration files.

Data source 104 is formed by the same type of data generated or used by application 108 during the running process. In one example, data source 104 is formed by log data generated by application 108 during running. In another example, data source 104 is formed by application programming interface information of http called by application 108. The above examples are only for describing the present disclosure, rather than specifically limiting the present disclosure. It is shown in FIG. 1 that application 108 includes data source 104. The above is only an example, rather than a specific limitation to the present disclosure. Computing device 106 may include a plurality of data sources for generating structured reports 110 including different types of data.

In FIG. 1, it is shown that configuration file 102 and data source 104 are within application 108 of computing device 106, which is only an example, rather than a specific limitation to the present disclosure. Configuration file 102 and data source 104 may be at other positions within computing device 106 or in an external computing device or a storage apparatus.

Computing device 106 sends generated structured data report 110 to target server 112. Target server 112 analyzes structured report 110 to realize the analysis of application 108. Example target server 112 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

With this method, the format of a structured report to be acquired can be adjusted at any time without version upgrade, thereby saving a lot of time. Meanwhile, resources used are also reduced, and the user experience is improved.

A schematic diagram of environment 100 in which a device and/or a method according to one or more embodiments of the present disclosure may be implemented as described above with reference to FIG. 1. The following describes a flowchart of method 200 for processing data according to one or more embodiments of the present disclosure with reference to FIG. 2. Method 200 may be implemented in computing device 106 in FIG. 1 or any other suitable devices.

At block 202, computing device 106 acquires configuration file 102 for generating and sending structured report 110, structured report 110 involving analysis of application 108. In order to generate structured report 110, computing device 106 may acquire configuration file 102.

In some embodiments, computing device 106 acquires configuration file 102 periodically. In some embodiments, computing device 106 may acquire the adjusted configuration file when determining that the configuration file is adjusted. In one example, when the content of configuration file 102 is adjusted or configuration file 102 is replaced, computing device 106 will be notified. Computing device 106 then acquires the adjusted configuration file 102. The above examples are only for describing the present disclosure, rather than specifically limiting the present disclosure. In the above manner, computing device 106 may obtain configuration file 102 accurately and in time.

In some embodiments, computing device 106 may determine when to generate an initialized structured report 110 based on a sending time for the previous structured report in configuration file 102. The process of generating the initialized structured report 110 may be seen in the description of FIG. 3. In some embodiments, computing device 106 directly generates initialized structured report 110 after reading the configuration file. The above examples are only for describing the present disclosure, rather than specifically limiting the present disclosure.

At block 204, computing device 106 acquires, based on an address of data source 104 in the configuration file, data from data source 104 to add the data to structured report 110. Data source 104 includes the same type of data generated by application 108. Computing device 106 uses the address of data source 104 in configuration file 102 to determine data source 104 for generating structured report 110.

In some embodiments, configuration file 102 includes an identifier of a data acquisition plugin, and the data acquisition plugin acquires data through the address of data source 104. Alternatively or additionally, the address of data source 104 is a parameter of the data acquisition plugin. In some embodiments, structured report 110 includes identifiers of a plurality of data acquisition plugins that acquire multiple different data from a plurality of different data sources. Alternatively or additionally, application 108 includes multiple different types of data acquisition plugins. Therefore, it is possible to determine which data acquisition plugins to use based on the types of the data acquisition plugins. In some embodiments, computing device 106 may acquire data directly based on the address in the configuration file. The above examples are only for describing the present disclosure, rather than specifically limiting the present disclosure.

At block 206, computing device 106 sends, based on an identifier of target server 112 in the configuration file, structured report 110 to target server 112 for analyzing application 108. Configuration file 102 also includes an address of target server 112. Computing device 106 uses the address of target server 112 in configuration file 102 to send the generated structured report 110 to target server 112.

In some embodiments, structured report 110 includes an identifier of a data output plugin. Alternatively or additionally, the identifier of the output plugin corresponds to the type of the output plugin. Application 108 includes multiple different types of output plugins, and output plugins to be called may be determined through the types of the output plugins. In some embodiments, there may be a plurality of configuration files for one application, and each configuration file may correspond to one generated structured report. Alternatively or additionally, the type of the output plugin in each configuration file may be different. Then, target server addresses, as an output plugin parameter, is utilized to send different structured reports to different target servers 112. In some embodiments, computing device 106 directly sends a structured report to target server 112 based on the address of the target server in configuration file 102. The above examples are only for describing the present disclosure, rather than specifically limiting the present disclosure.

With this method, the format of a structured report to be acquired can be adjusted at any time without version upgrade, thereby saving a lot of time. Meanwhile, resources used are reduced, and the user experience is improved.

Figure 2:
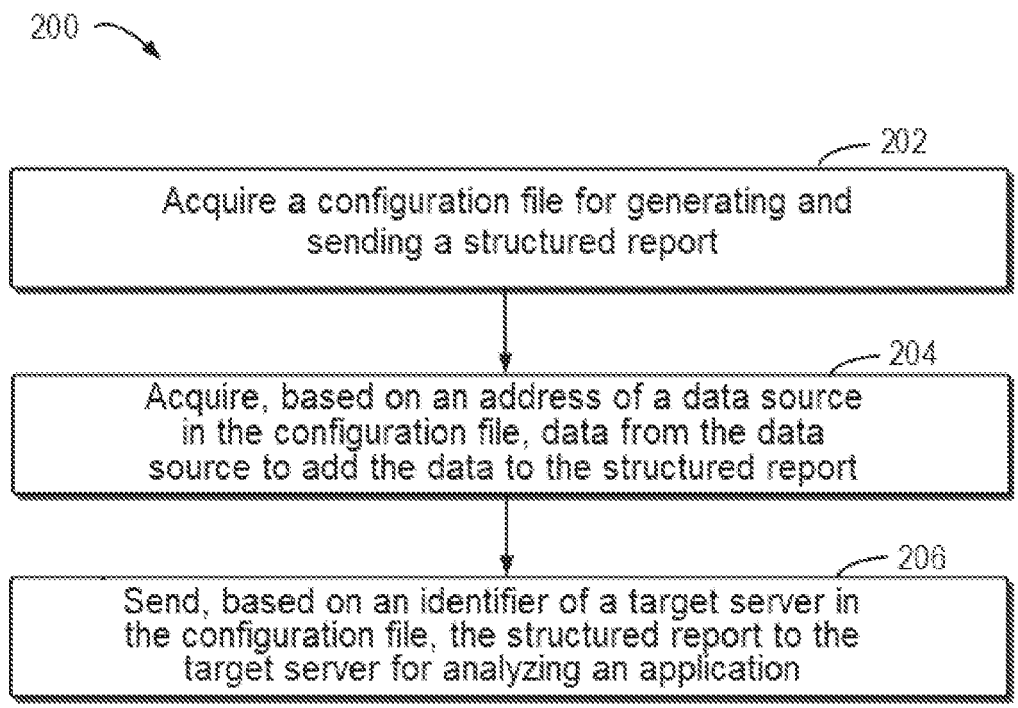
FIG. 2 illustrates a flowchart of method 200 for processing data according to one or more embodiments of the present disclosure.
Figure 3:
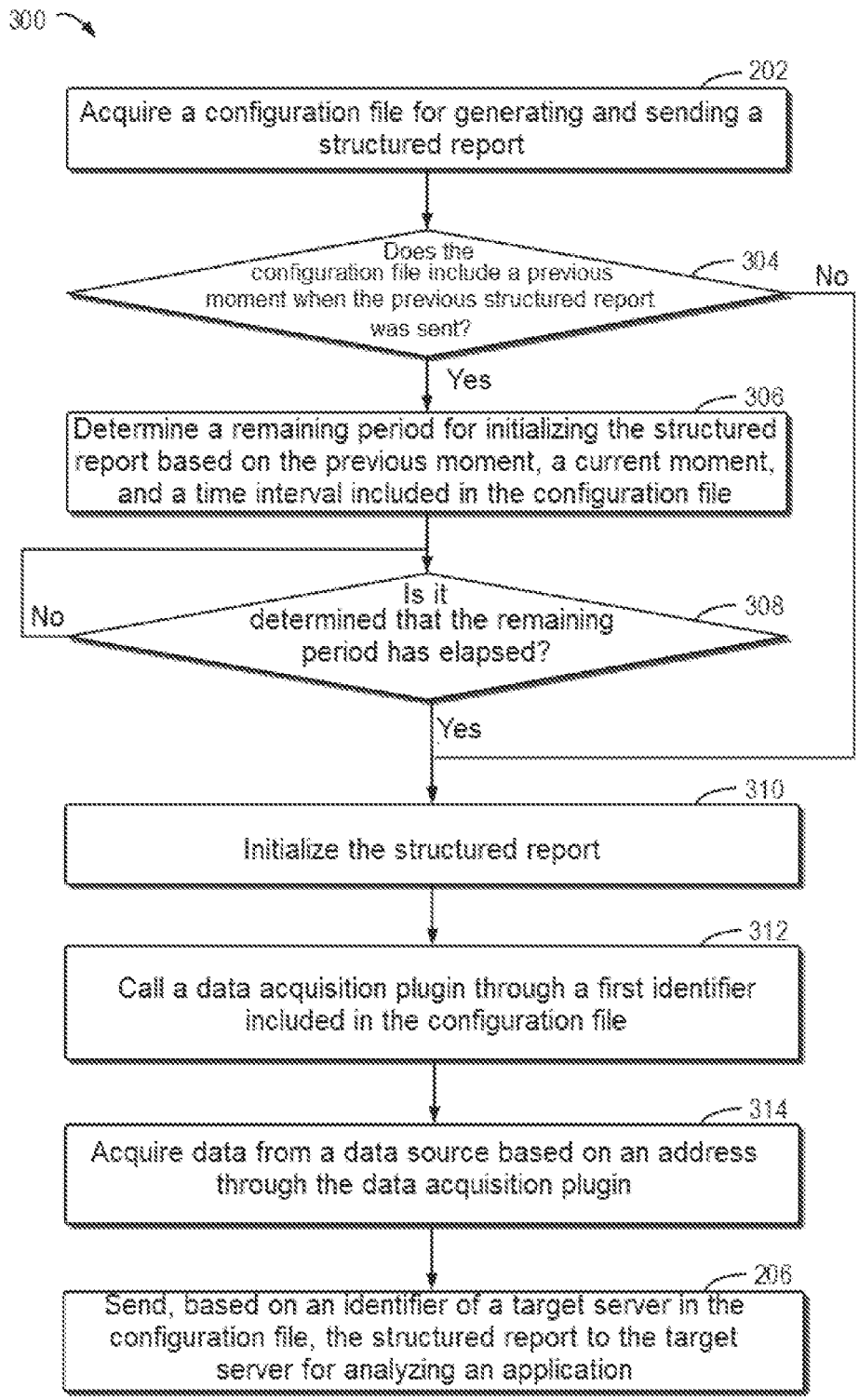
FIG. 3 illustrates a flowchart of method 300 for processing data according to one or more embodiments of the present disclosure.

The above has described method 200 for processing data according to the embodiments of the present disclosure with reference to FIG. 2. A more detailed method for processing data will be described below in connection with FIG. 3. FIG. 3 illustrates a flowchart of method 300 for processing data according to one or more embodiments of the present disclosure. Method 300 in FIG. 3 may be implemented in computing device 106 in FIG. 1 or any other suitable devices. The operations of block 202 and block 206 in FIG. 3 are the same as the operations of block 202 and block 206 in FIG. 2, and will not be described in detail here.

At block 304, the computing device determines whether the configuration file includes a previous moment when the previous structured report was sent. If the previous moment is not included, it indicates that computing device 106 has not sent structured report 110 to target server 112. Then at block 310, computing device 106 initializes structured report 110. In one example, computing device 106 generates an empty structured report 110.

If the previous moment is included, a remaining period for initializing the structured report is determined using the previous moment, a current moment, and a time interval included in the configuration file at block 306. The time interval indicates a time period between two adjacent transmissions of the structured report to the target server. In one example, the current moment and the previous moment may be used to determine how long the previous structured report has been sent. Then, it is determined how long it takes before the next structured report is sent according to the time interval of sending the structured report.

At block 308, it is determined whether the remaining period has elapsed. In one example, the remaining period may be used for timing. When the timing expires, it indicates that the remaining period has elapsed. After the remaining period has elapsed, the structured report is initialized at block 310. If the remaining period has not elapsed, the process proceeds back to box 308 for confirmation. In the above manner, the structured report can be generated on time, so that the structured report can be sent at a fixed period.

At block 312, computing device 106 calls a data acquisition plugin through a first identifier included in configuration file 102, the first identifier being used for identifying the data acquisition plugin associated with the address. In order to better acquire data from a data source, application 108 may include a plurality of data acquisition plugins that may obtain data from different data sources, or a plurality of data acquisition plugins that may obtain data from different data sources from other components or devices. Configuration file 102 includes an identifier of the data acquisition plugin, through which the data acquisition plugin is called. The address of the data source may be provided to the data acquisition plugin as a parameter of the data acquisition plugin.

In some embodiments, computing device 106 detects from configuration file 102 whether there is an identifier of a data acquisition plugin. If so, the data acquisition plugin is called through the plugin identifier. Alternatively or additionally, the data acquisition plugin is distinguished through the type of the data acquisition plugin. Different types of data acquisition plugins are configured to acquire data from different types of data sources. In some embodiments, the data source type may be a log source, a file source, an http source, or the like. The log source is configured to store log information. The file source is configured to store information such as accessed or generated files. The http source is configured to store information about an http application programming interface, etc. In some embodiments, if the data acquired from the data source through the data acquisition plugin is not in a predetermined data format, the data acquisition plugin may adjust the format of the acquired data, for example, convert the format to a Json format. The above examples are only for describing the present disclosure, rather than specifically limiting the present disclosure.

At block 314, computing device 106 acquires data from the data source based on the address through the data acquisition plugin. In this way, the data in the data source can be quickly and accurately obtained, and the data processing efficiency can be improved.

In some embodiments, after acquiring the data, computing device 106 also determines whether there are identifiers and parameters of other data acquisition plugins in configuration file 102. If so, other data acquisition plugins are continuously called to acquire data.

In some embodiments, computing device 106 also determines from the configuration file whether there is an identifier of a data processing plugin that is to perform a predetermined operation on the data in the structured report. If there are the identifier and parameter of the data processing plugin, the predetermined operation is performed on the data through the data processing plugin. The data processing plugin may perform various operations on the data. In one example, a data processing plugin is called to delete a field in the data. In another example, another data processing plugin is called to add a field to the data. In another example, yet another data processing plugin is called to delete redundant data in the data, etc. In some embodiments, the data processing plugin may also update some fields in the configuration file. The above examples are only for describing the present disclosure, rather than specifically limiting the present disclosure.

When an output plugin is detected through configuration file 102, the identifier of target server 112 in the configuration file is sent to the data output plugin as a parameter, and the structured report is also sent to the output plugin to generate a sendable file in a predetermined format such as a file in a Json format. In some embodiments, the output plugin may be acquired based on the type of the output plugin in configuration file 102. Different types of output plugins may be configured to send structured reports to different target servers. Then, the output plugin sends the structured report to target server 112 for analysis based on the identifier of target server 112. In some embodiments, the output plugin may be a gateway output plugin, an http output plugin, an email output plugin, etc. The above examples are only for describing the present disclosure, rather than specifically limiting the present disclosure.

With the above method, the format of telemetry data can be enabled and changed at runtime without upgrading the version, and the content to be sent in the structured report can be easily added/deleted, thereby saving a lot of development time.

Figure 4:
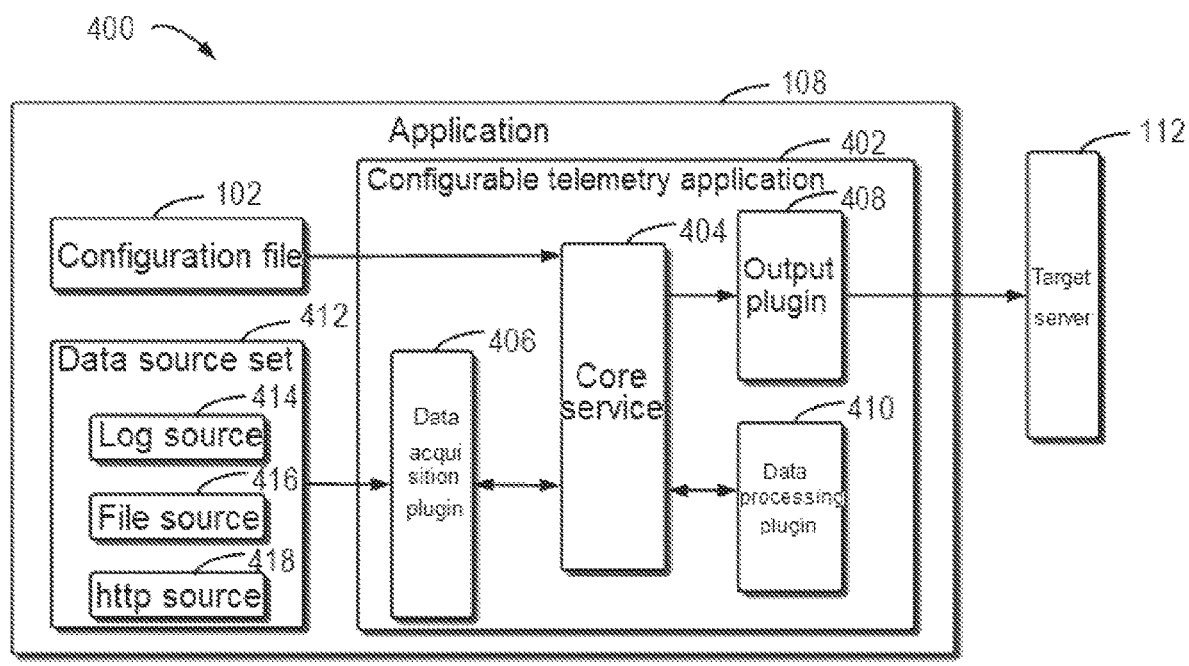
FIG. 4 illustrates a schematic diagram of example 400 where a device and/or a method according to one or more embodiments of the present disclosure may be implemented.

The flowchart for processing data has been described above in conjunction with FIG. 3. An example for processing data is described below in conjunction with FIG. 4. FIG. 4 illustrates a schematic diagram of example 400 where a device and/or a method according to one or more embodiments of the present disclosure may be implemented.

As shown in FIG. 4, application 108 is included in example 400. Application 108 includes configuration file 102 and data source set 412. Data source set 412 includes log source 414, file source 416, and http source 418. Data source set 412 shown in FIG. 4 including three data sources is only an example, and is not a specific limitation to the present disclosure. Data source set 412 may include any number of data sources of any type.

Application 108 includes configurable telemetry application 402 that may be configured to generate a structured report, which includes core service 404, data acquisition plugin 406, data processing plugin 410, and output plugin 408.

Core service 404 is configured to acquire configuration file 402. Then, a corresponding plugin is selected based on the type of data acquisition plugin 406 in configuration file 102, and data is acquired from a corresponding data source in data source set 412 based on a data source address in the parameter of the plugin of configuration file 102 for writing the data into the structured report.

If configuration file 102 still has an identifier of data processing plugin 410, core service 404 may call data processing plugin 410 to perform various processing on the data, such as adding fields, deleting fields, or removing redundant data in the data. If core service 404 detects an identifier of output plugin 408, output plugin 408 is called through the identifier of output plugin 408. Output plugin 408 generates a file in a predetermined format from the structured report, such as a Json file. The structured report is then sent to target server 112 for analysis.

In some embodiments, configurable telemetry application 402 may be installed to other applications in the form of an installation package to generate structured reports of other applications. In this way, the availability of configurable telemetry applications among different applications is improved, and the workload of developers is reduced.

Figure 5:
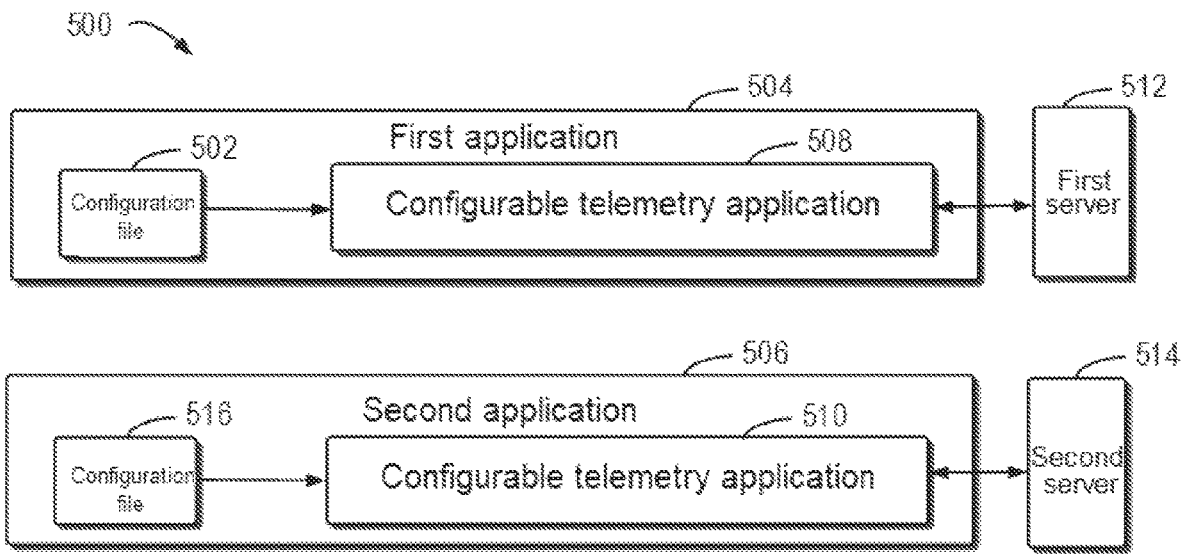
FIG. 5 illustrates a schematic diagram of example 500 of different applications utilizing different configuration files according to one or more embodiments of the present disclosure.
Figure 6:
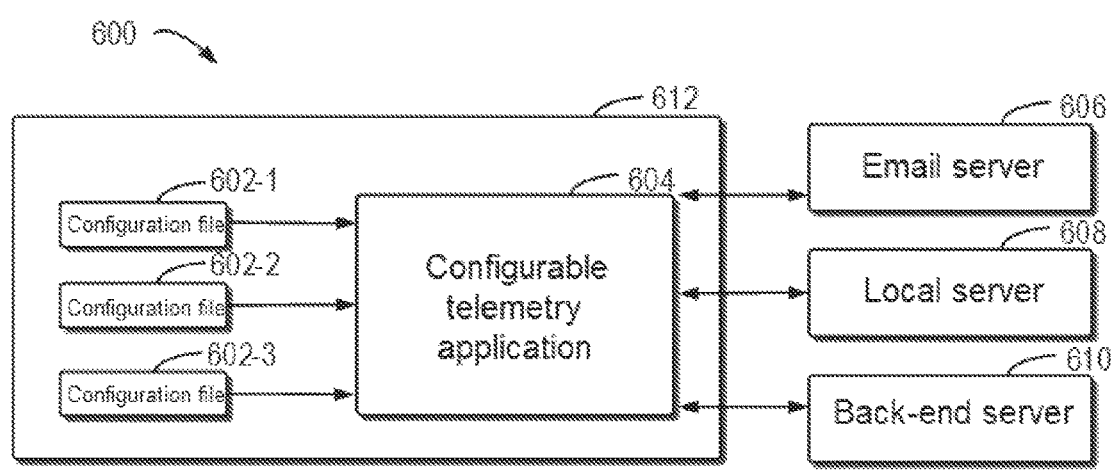
FIG. 6 illustrates a schematic diagram of example 600 of an application utilizing different configuration files according to one or more embodiments of the present disclosure.
Figure 7:
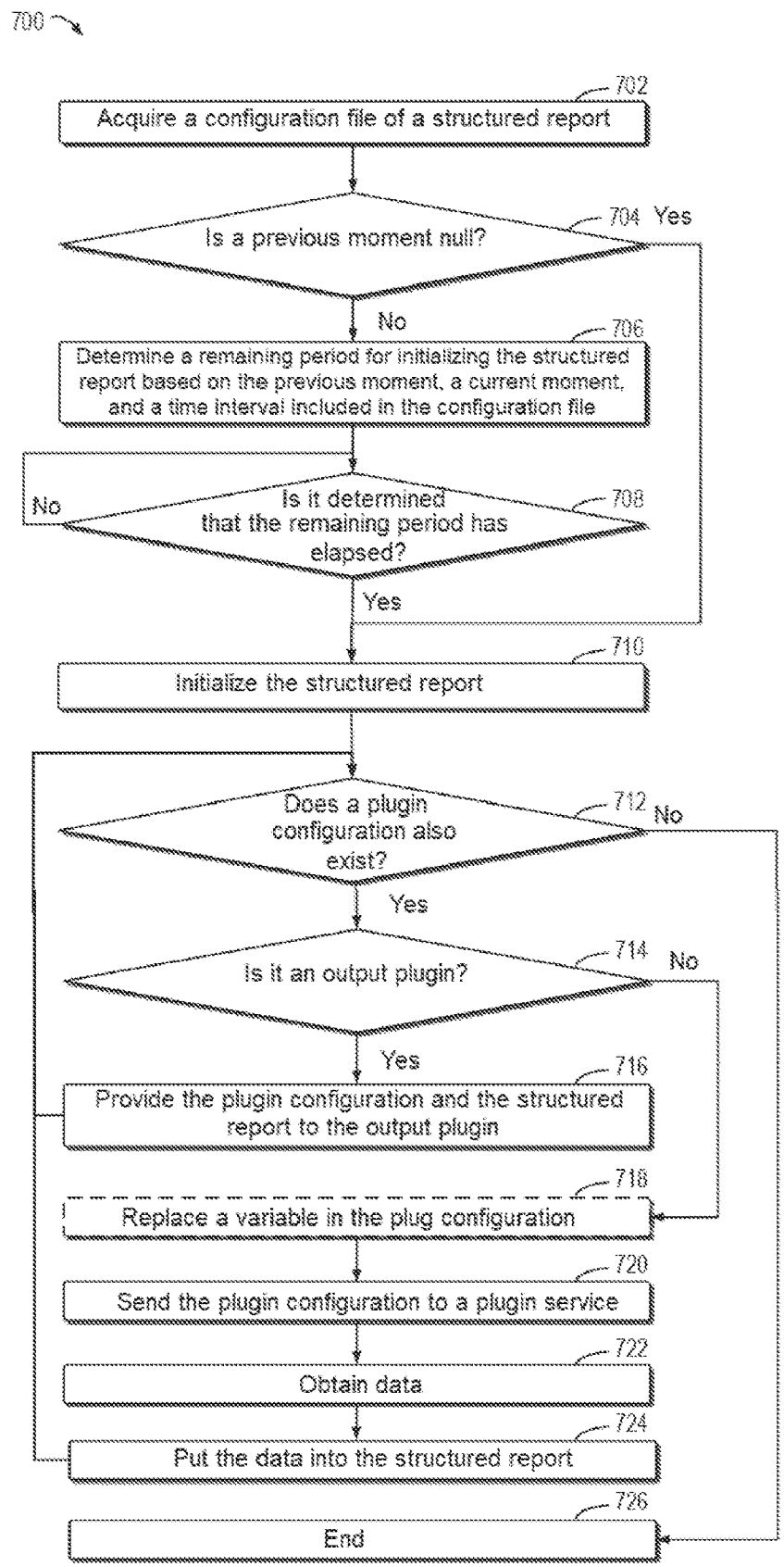
FIG. 7 illustrates a flowchart of method 700 for processing data according to one or more embodiments of the present disclosure.

The schematic diagram of example 400 for processing data has been described above in conjunction with FIG. 4. In addition, different applications may utilize different configuration files to send structured reports to different target servers. In addition, the same application may also use different configuration files to send different structured reports to different target servers. The two situations will be described below in conjunction with FIG. 5 and FIG. 6. FIG. 5 describes a schematic diagram of example 500 where different applications utilize different configuration files. FIG. 6 describes a schematic diagram of example 600 where an application utilizes different configuration files.

As shown in FIG. 5, first application 504 includes configuration file 502 and configurable telemetry application 508. Configurable telemetry application 508 utilizes configuration file 502 to generate a corresponding structured report, and sends the structured report to first server 512. Second application 506 includes configuration file 516 and configurable telemetry application 510. Configurable telemetry application 510 utilizes configuration file 516 to generate another structured report and send the structured report to second server 514.

In FIG. 6, application 612 includes three configuration files 602-1, 602-2, and 602-3, and configurable telemetry application 604. Configurable telemetry application 604 may then utilize the three configuration files to send structured reports to three different target servers: email server 606, local server 608, or application-related back-end server 610. The above is only an example, rather than a specific limitation to the present disclosure.

An example where a configuration file may be utilized to send a structured report to a target server is described above in conjunction with FIG. 5 and FIG. 6. The following describes a flowchart of method 700 for processing data according to one or more embodiments of the present disclosure with reference to FIG. 7.

At block 702, computing device 106 first acquires a configuration file of a structured report. Computing device 106 reads data from the configuration file.

In one example, configuration file 102 may include a name of the structured report, a sending time of the previous structured report, global parameters in the structured report, and a plugin configuration. The plugin configuration includes identifiers of different plugins that may be used for calling, and parameters transmitted to the plugins.

At block 704, computing device 106 determines whether a previous moment when the previous structured report was sent is null. If so, it indicates that the computing device has not sent a structured report, the structured report is initialized at block 710. If not, computing device 106 determines a remaining time for initializing the structured report or sending the structured report using the previous moment, a current moment, and a time interval included in the configuration file at block 706. Then at block 708, computing device 106 determines whether the remaining period has elapsed. If the remaining period has not elapsed, the determination continues at block 708. If the remaining period has elapsed, computing device 106 initializes structured report 110 at block 710.

Then at block 712, computing device 106 determines whether a plugin configuration further exists in configuration file 102. If not, the execution ends at block 726. If so, it indicates there is a plugin that needs to be called. Then at block 714, computing device 106 determines whether the plugin to be called is an output plugin. If it is an output plugin, the plugin configuration and the structured report are provided to the output plugin at block 716, so that the output plugin can process the structured report, for example, adjust the format of the structured report. Then, the structured report is sent to the target server. If it is not an output plugin, computing device 106 replaces a global variable in the plugin configuration with a value set in the global variable in block 718. If there are no global variables in the plugin configuration, block 718 may not be executed. Then, at block 720, computing device 106 sends the plugin configuration to the plugin service. In some embodiments, sending the plugin configuration to the plugin service further includes: sending the type of a plugin to be called and corresponding parameters to the plugin service. Alternatively or additionally, the type of the data acquisition plugin and the address of the data source are sent to the plugin service to acquire data from the data source; or the type of the processing plugin and the structured report are sent to allow the processing plugin to process the structured report. Then at block 722, computing device 106 obtains data from the plugin. Then at block 724, computing device 106 puts the data in the structured report. Then, the process proceeds back to block 712 for execution.

With the above method, the format of telemetry data can be adjusted at any time as required without the version upgrade of a software system, thereby saving a lot of time and resources.

Figure 8:
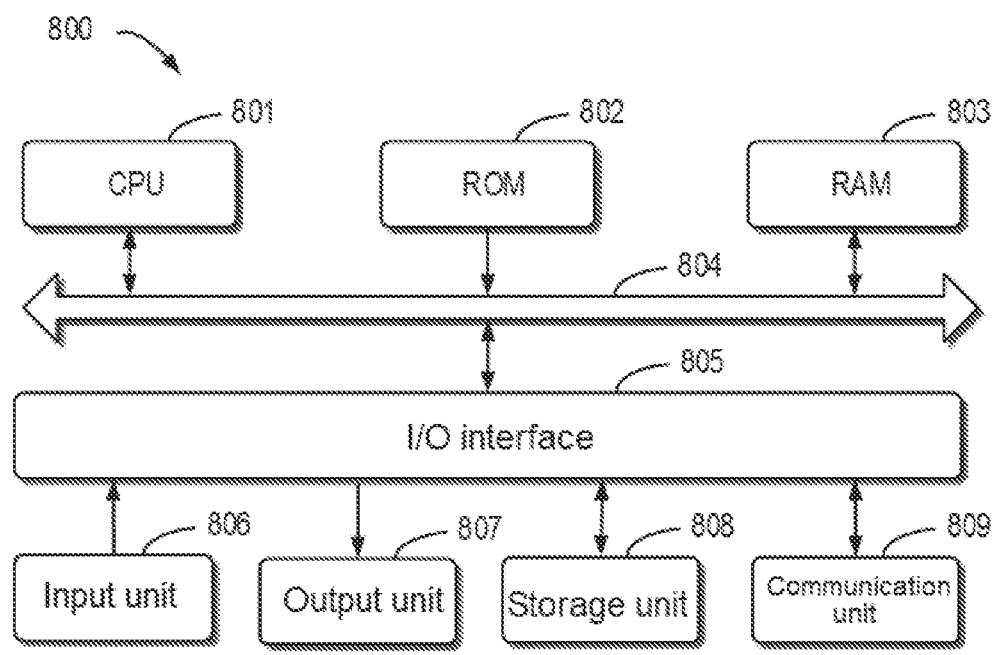
FIG. 8 illustrates a schematic block diagram of example device 800 suitable for implementing one or more embodiments of the present disclosure.

FIG. 8 shows a schematic block diagram of example device 800 that may be configured to implement one or more embodiments of the present disclosure. For example, computing device 106 and target server 112 as shown in FIG. 1 may be implemented by device 800. As shown in the figure, device 800 includes central processing unit (CPU) 801, which may execute various appropriate actions and processing in accordance with computer program instructions stored in read-only memory (ROM) 802 or computer program instructions loaded onto random access memory (RAM) 803 from storage unit 808. In RAM 803, various programs and data required for the operation of device 800 may also be stored. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

The various processes and processing described above, such as methods 200, 300, and 700, may be performed by processing unit 801. For example, in some embodiments, methods 200, 300, and 700 may be implemented as a computer software program that is tangibly included in a machine-readable medium such as storage unit 808. In some embodiments, some or all of the computer program may be loaded into and/or installed onto device 800 via ROM 802 and/or communication unit 809. When the computer programs are loaded to RAM 803 and executed by CPU 801, one or more actions in methods 200, 300, and 700 described above may be executed.

The embodiments of the present disclosure relate to a method, an electronic device, and/or a computer program product. The embodiments of the present disclosure may further include a computer-readable storage medium having computer-readable program instructions for performing various aspects of the present disclosure.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or a raised structure in a groove having instructions stored thereon, and any suitable combination thereof. The computer-readable storage medium used here is not explained as transient signals themselves, such as radio waves or other freely propagating electromagnetic waves, electromagnetic waves propagating through waveguides or other transmission media (e.g., optical pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network (LAN), a wide area network (WAN), and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++, and conventional procedural programming languages such as "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In case of a remote computer being involved, the remote computer may be connected to a user computer through any type of network, including an LAN or a WAN, or may be connected to an external computer, e.g., connected through the Internet using an Internet service provider. In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the methods, the apparatuses/systems, and the computer program products according to the embodiments of the present disclosure. It should be understood that each block in the flowcharts and/or block diagrams as well as a combination of blocks in the flowcharts and/or block diagrams may be implemented by using the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions may also be loaded onto a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, the program segment, or the part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, or to enable other persons of ordinary skill in the art to understand the various embodiments disclosed herein.

The invention claimed is:

1. A method for processing data, comprising:
having a process for acquiring structured reports, the process being performed by and hard-coded in a software system,
wherein the structured reports are reflected in a format;
needing to make an adjustment of the format to a new format;
instead of upgrading the software system to have the structured reports reflect the new format:
acquiring a configuration file for generating and sending a structured report, the structured report involving analysis of an application;
acquiring, based on an address of a data source in the configuration file, data from the data source to add the data in the new format to the structured report, the data source comprising the same type of data generated by the application; and
sending, based on an identifier of a target server and a second identifier of an output plugin in the configuration file, the structured report through the output plugin to the target server for analyzing the application,
wherein the output plugin comprises a gateway.

2. The method according to claim 1, wherein acquiring the configuration file comprises:
acquiring the configuration file periodically; or
acquiring an adjusted configuration file in response to determining that the configuration file is adjusted.

3. The method according to claim 1, wherein acquiring the data comprises:
calling a data acquisition plugin through a third identifier included in the configuration file, the third identifier being used for identifying the data acquisition plugin associated with the address; and
acquiring the data from the data source based on the address through the data acquisition plugin.

4. The method according to claim 1, further comprising:
initializing the structured report based on the configuration file.

5. The method according to claim 4, wherein initializing the structured report comprises:
determining whether the configuration file comprises a previous moment when the previous structured report was sent;
in response to determining that the configuration file comprises the previous moment, determining a remaining period for initializing the structured report based on the previous moment, a current moment, and a time interval included in the configuration file, the time interval indicating a time period between two adjacent transmissions of the structured report to the target server; and
initializing the structured report in response to determining that the remaining period has elapsed.

6. The method according to claim 5, wherein initializing the structured report further comprises:
in response to determining that the configuration file does not include the previous moment, initializing the structured report.

7. The method according to claim 1, further comprising:
acquiring, from the configuration file, a third identifier of a data processing plugin that is to perform a predetermined operation on the data in the structured report;
calling the data processing plugin through the third identifier; and
performing the predetermined operation on the data through the data processing plugin.

8. An electronic device, comprising:
at least one processor; and
a memory, coupled to the at least one processor and having instructions stored thereon, wherein when executed by the at least one processor, the instructions cause the electronic device to perform the following actions comprising:
having a process for acquiring structured reports, the process being performed by and hard-coded in a software system, wherein the structured reports are reflected in a format;
needing to make an adjustment of the format to a new format;
instead of upgrading the software system to have the structured reports reflect the new format:
acquiring a configuration file for generating and sending a structured report, the structured report involving analysis of an application;
acquiring, based on an address of a data source in the configuration file, data from the data source to add the data in the new format to the structured report, the data source comprising the same type of data generated by the application; and
sending, based on an identifier of a target server and a second identifier of an output plugin in the configuration file, the structured report through the output plugin to the target server for analyzing the application,
wherein the output plugin comprises a gateway.

9. The electronic device according to claim 8, wherein acquiring the configuration file comprises:
acquiring the configuration file periodically; or
acquiring an adjusted configuration file in response to determining that the configuration file is adjusted.

10. The electronic device according to claim 8, wherein acquiring the data comprises:
calling a data acquisition plugin through a third identifier included in the configuration file, the third identifier being used for identifying the data acquisition plugin associated with the address; and
acquiring the data from the data source based on the address through the data acquisition plugin.

11. The electronic device according to claim 8, wherein the actions further comprise:
initializing the structured report based on the configuration file.

12. The electronic device according to claim 11, wherein initializing the structured report comprises:
determining whether the configuration file comprises a previous moment when the previous structured report was sent;
in response to determining that the configuration file comprises the previous moment, determining a remaining period for initializing the structured report based on the previous moment, a current moment, and a time interval included in the configuration file, the time interval indicating a time period between two adjacent transmissions of the structured report to the target server; and initializing the structured report in response to determining that the remaining period has elapsed.

13. The electronic device according to claim 12, wherein initializing the structured report further comprises:

in response to determining that the configuration file does not include the previous moment, initializing the structured report.

14. The electronic device according to claim 8, wherein the actions further comprise:

acquiring, from the configuration file, a third identifier of a data processing plugin that is to perform a predetermined operation on the data in the structured report;

calling the data processing plugin through the third identifier; and performing the predetermined operation on the data through the data processing plugin.

15. A non-transitory computer readable medium comprising instructions, wherein when executed by a processor of an electronic device, the instructions cause the electronic device to:

have a process for acquiring structured reports, the process being performed by and hard-coded in a software system, wherein the structured reports are reflected in a format;

need to make an adjustment of the format to a new format;

instead of upgrading the software system to have the structured reports reflect the new format:

acquire a configuration file for generating and sending a structured report, the structured report involving analysis of an application;

acquire, based on an address of a data source in the configuration file, data from the data source to add the data in the new format to the structured report, the data source comprising the same type of data generated by the application; and send, based on an identifier of a target server and a second identifier of an output plugin in the configuration file, the structured report through the output plugin to the target server for analyzing the application, wherein the output plugin comprises a gateway.

16. The non-transitory computer readable medium of claim 15, wherein acquiring the data comprises:

calling a data acquisition plugin through a third identifier included in the configuration file, the third identifier being used for identifying the data acquisition plugin associated with the address; and acquiring the data from the data source based on the address through the data acquisition plugin.

17. The non-transitory computer readable medium of claim 15, further comprising:

initializing the structured report based on the configuration file.

18. The non-transitory computer readable medium of claim 17, wherein initializing the structured report comprises:

determining whether the configuration file comprises a previous moment when the previous structured report was sent;

in response to determining that the configuration file comprises the previous moment, determining a remaining period for initializing the structured report based on the previous moment, a current moment, and a time interval included in the configuration file, the time interval indicating a time period between two adjacent transmissions of the structured report to the target server; and initializing the structured report in response to determining that the remaining period has elapsed.

19. The non-transitory computer readable medium of claim 18, wherein initializing the structured report further comprises:

in response to determining that the configuration file does not include the previous moment, initializing the structured report.

20. The non-transitory computer readable medium of claim 15, further comprising:

acquiring, from the configuration file, a third identifier of a data processing plugin that is to perform a predetermined operation on the data in the structured report;

calling the data processing plugin through the third identifier; and performing the predetermined operation on the data through the data processing plugin.

* * * * *